United States Patent Office 3,761,416
Patented Sept. 25, 1973

3,761,416
COMPOSITE PARTICLES AND PROCESS
FOR PREPARING SAME
Norman E. Stahlheber, Columbia, Ill., assignor to
Monsanto Company, St. Louis, Mo.
No Drawing. Continuation-in-part of abandoned applications Ser. No. 888,841 and 888,842, both Dec. 29, 1969. This application Apr. 19, 1971, Ser. No. 135,455
Int. Cl. C11d 7/56
U.S. Cl. 252—99                                        8 Claims

ABSTRACT OF THE DISCLOSURE

Granular composite particles comprising a buffered chlorocyanurate and partially hydrated sodium tripolyphosphate are resistant to chemical and physical degradation and are particularly useful as ingredients of detergent formulations and are readily prepared by spraying an aqueous slurry of a chlorocyanurate buffered to a pH of 5 to 8 onto a fluidized bed of hydrateable sodium tripolyphosphate.

BACKGROUND OF THE INVENTION

Field of the invention

This application is a continuation-in-part of U.S. patent applications, Ser. Nos. 888,841 and 888,842, each filed Dec. 29, 1969 and both now abandoned.

The invention relates to novel granular particles comprising a buffered chlorocyanurate and partially hydrated sodium tripolyphosphate. In a particularly preferred embodiment of the invention, the buffered chlorocyanurate is preferentially internally concentrated in the particles.

Further, the invention relates to an improved fluidized bed process for making granular compositions composed of particles comprising a chlorocyanurate preferentially internally concentrated or substantially encapsulated within a matrix or coating of partially hydrated sodium tripolyphosphate.

It is well known that practical utility of commercial cyanurates is limited by physical or chemical incompatibility with ingredients of formulations in which they would otherwise be desirably employed, or, with atmospheric moisture under normal storage conditions, for example, commercially available chlorocyanurates are generally in the form of very fine particles which, when mixed with various carrier agents, tend to segregate or stratify therefrom. Such stratification is undesirable since it renders the packaged composition non-homogeneous and uniform results are not obtained as successive portions of the package are utilized. Thus, the chlorocyanurate is considered "physically incompatible" in such mixtures. In addition, the chlorocyanurates tend to decompose in contact with atmospheric moisture thereby losing chlorine available for bleaching and producing an undesirable chlorine odor. The chlorocyanurates also tend to be reactive with certain conventional detergent ingredients, for example, nonionic surface actives, and cannot be readily combined with such ingredients to provide stable, all purpose bleaching-cleaning formulations.

A process for preparing chlorocyanurate products in the form of particles comprising a chlorocyanurate preferentially internally concentrated within a partially hydrated matrix of sodium tripolyphosphate is described in U.S. patent application, Ser. No. 842,890, filed July 18, 1969 and now U.S. Pat. No. 3,650,961 (the disclosure of said application being incorporated herein by reference). Although the particulate products described provide substantial advantages in terms of physical and chemical compatibility, an undesirable friability (tendency of the particles to fragment when subjected to rough handling) is observed and significant (although substantially reduced) chlorine loss occurs under adverse environmental conditions.

SUMMARY OF THE INVENTION

It is an object of this invention to provide novel chlorocyanurate containing particles highly resistant to chlorine loss and sufficiently physically stable to resist fragmentation thereby providing physical compatibility in detergent formulations.

These particles comprise a buffered chlorocyanurate and partially hydrated sodium tripolyphosphate. In a particularly preferred embodiment, the buffered chlorocyanurate is preferentially internally concentrated in the particles.

It is a further object of this invention to provide improved fluidized bed processes of the type described in the aforementioned patent application to provide less friable products having greater resistivity to chemical degradation.

Basically, these objects are achieved by buffering the chlorocyanurate slurry to a pH of 5 to 8 prior to introducing droplets of the slurry into a fluidized bed of hydrateable, sodium tripolyphosphate.

The characteristics of the particles of this invention and methods for their manufacture will be understood from the following description of the preferred embodiments.

DESCRIPTION OF THE PREFERRED EMBODIMENTS

The particles of this invention comprise buffered chlorocyanurate and partially hydrated sodium tripolyphosphate.

The phrase "buffered chlorocyanurate" as used hereinafter in the specification and claims refers to chloroisocyanurate intimately associated with a quantity of buffer equivalent to at least 25% of the chlorocyanurate weight or at least 1% of the total particle weight (whichever is greater), which buffered chlorocyanurate is derived from an aqueous slurry of chlorocyanurate buffered to a pH of from 5 to 8.

The chlorocyanurate slurry is buffered by the presence in solution in slurry of any of the well-known buffering systems, exhibiting buffering action in the pH range 5 to 8 which are chemically compatible with the chloroisocyanurate. Buffering systems comprising alkali metal phosphates, phosphonates, polyphosphates, borates and mixtures thereof are particularly desirable in view of the recognized utility of these materials in detergent formulations.

The buffered slurry can be conveniently prepared, for example, by adding a sufficient amount of an appropriate salt to a solution of acid or more acid salt to provide the desired pH range and thereby adding the chlorocyanurate. Examples of various acid-salt combinations and lower ratios providing buffering action in the pH range of 5 to 8 are shown in Table I below:

TABLE I

| Acid (or acid salt) | Salt | Molar ratio acid/salt |
|---|---|---|
| $H_3PO_4$ | $Na_2HPO_4$ | 0.33 |
| $H_3PO_4$ | $Na_4P_2O_7$ | 0.33 |
| $H_3PO_4$ | $Na_5P_3O_{10}$ | 0.50 |
| $H_4P_2O_7$ [a] | $Na_5P_3O_{10}$ | 0.33 |
| $H_4P_2O_7$ [a] | $Na_4P_2O_7$ | 0.50 |
| $H_2SO_4$ | $Na_5P_3O_{10}$ | 1.0 |
| $Na_2H_2P_2O_7$ | $Na_5P_3O_{10}$ | 1.5 |
| $NaH_2PO_4$ | $Na_5P_3O_{10}$ | 4.0 |
| $HEDP$ [b] | $Na_4P_2O_7$ | 0.33 |

[a] Polyphosphoric acids which include randomly recognized acids generally termed "superphosphoric acid."
[b] Hydroxyethylidenediphosphonic acid.

It will be recognized by those skilled in the art that the foregoing disclosure of buffer systems are merely representative since numerous acids and salts or bases and salts can be combined in portions yielding suitable buffering action in accordance with recognized chemical principles. It will be further recognized that the use of organic acids subject to chemical attack by chlorocyanurates, e.g., citric acid and acetic acid, and ammonium salts which react with chlorocyanurates to form nitrogen trichloride, is to be avoided. Formation of buffered systems utilizing sodium tripolyphosphate adjusted to the proper pH range by an appropriate acid, e.g., hydrochloric, sulfuric or phosphoric (or an acidic alkali metal salt of phosphoric acid) is particularly desirable. It is essential that the amount of buffer utilized correspond to at least 25% of the weight of chlorocyanurate in order to provide satisfactory chemical stabilization and correspond to at least 1% of the total weight of the product particle in order to provide resistance to fragmentation.

The chlorocyanurates utilized in the slurry include the well-known sodium and potassium salts of di- and tri- chlorocyanuric acid [(mono-trichloro,) tetra-(mono-potassium dichloro,)] pentaisocyanurate, and (trichloro,) (monopotassium dichloro,) diisocyanurate.

The sodium tripolyphosphate used to form the particles must be readily hydrateable. That is, it must be capable of taking up the water from the droplets as water of hydration. Otherwise, a separate drying step is required. Generally, the use of substantially anhydrous salt is preferred although partially hydrated salt may be employed if desired. The term "partially hydrated salt" refers to lower hydrates of salts capable of forming higher hydrates, or mixtures of anhydrous and hydrate particles. The sodium tripolyphosphate can be employed in admixture with other polyphosphates, or phosphate salts if desired.

The particles of the invention are formed by adding the slurry to granular powdered hydrateable sodium tripolyphosphate and mixing to effect agglomeration. The quantity of slurry admixed with the sodium tripolyphosphate is controlled so that the water present therein is less than that stoichiometrically required for total hydration of the sodium tripolyphosphate, and is generally from 20 to 70% by weight of the stoichiometric quantity. Thus, in the product particle, the sodium tripolyphosphate is only partially hydrated. The incompletely hydrated salt is capable of protecting the chlorocyanurate by taking up additional water from the atmosphere.

A particularly preferred embodiment of this invention comprises particulate product wherein the chlorocyanurate is preferentially internally concentrated in the particle. Such preferred product is most conveniently prepared by the following improved process.

In the basic process, of which this invention is an improvement, particulate sodium tripolyphosphate is fluidized by a flow of inert gas or mechanical agitation. Droplets of an aqueous slurry of a chlorocyanurate are sprayed onto the fluidized bed. The fluidized salt coats the droplets, absorbing water therefrom and forming a particle wherein the chlorocyanurate is preferentially concentrated internally in the particle which comprises the chlorocyanurate and partially hydrated sodium tripolyphosphate.

The process can be performed in conventional batch type or continuous fluidized bed apparatus. Although continuous introduction of ingredients into the fluidized bed and simultaneous removal of products are generally desirable, such continuous operation is not essential. As mentioned, fluidization of the inorganic salt can be accomplished by mechanical rather than pneumatic means, however, since mechanical fluidization may result in some degree of comminution of product particles, pneumatic fluidization with an inert gas is generally preferred. The term "inert gas" is used in a broad sense to include any gas which is substantially non-reactive with the raw materials being processed. Thus, air as well as helium, argon, nitrogen and the like generally constitutes an acceptable fluidizing gas.

The sodium tripolyphosphate used in the fluidized bed must consist of particles, a major proportion of which have a size of from 5 to 200 microns, preferably, from 10 to 150 microns, a size of 10 to 50 microns being particularly preferred. Particle size is determined by gravimetric sedimentation type analysis. Smaller sized particles are swept from the bed under normal fluidization conditions and larger fluid bed particles do not form product particles wherein the chlorocyanurate is preferentially internally concentrated. Relative uniformity of fluid bed particle size is desirable but not essential.

The chlorocyanurate is dispersed as a slurry in water. The degree of preferential concentration of the chlorocyanurate in the interior of the particles is related to the solubility and concentration of the chlorocyanurate in the slurry. The degree of preferential concentration may be such that the product particle comprises a center of chlorocyanurate encapsulated within partially hydrated salt, or the chlorocyanurate may be distributed through the sodium tripolyphosphate matrix in gradually decreasing concentration from center to periphery of the particles. Addition of a slurry containing high quantities of undissolved chlorocyanurates favors formation of a product particle wherein the chlorocyanurate is essentially encapsulated within a sodium tripolyphosphate shell relatively free of chlorocyanurate. Such preferential internal concentrations of the chlorocyanurate decreases as more soluble chlorocyanurates are utilized.

In the practice of the present invention, the chlorocyanurate slurry is buffered to a pH range of from 5 to 8. This is accomplished by the presence in solution in the slurry of any of the well-known buffering systems exhibiting buffering action in the aforementioned range which are chemically compatible with the chlorocyanurate as previously discussed.

Formation of a buffered system utilizing sodium tripolyphosphate (economically obtained in the form of "fines" swept from the fluidized bed) adjusted to the proper pH range by an appropriate acid, e.g., hyrochloric, sulfuric or phosphoric (or an acidic alkali metal salt of phosphoric acid) is particularly desirable from the standpoint of convenience and economy.

The amount of buffer utilized should be at least 25% of the weight of chlorocyanurate in the slurry to provide satisfactory chemical stabilization, and at least 1% preferably at least 2% by weight of the finished product to substantially reduce friability thereof.

The quantity of buffered slurry introduced into the fluidized bed is controlled so that the water present therein is less than that stoichiometrically required for total hydration of the sodium tripolyphosphate, and is generally from 20 to 70% by weight of the stoichiometric quantity. Thus, in the product particle, the sodium tripolyphosphate is only partially hydrated. The incompletely hydrated salt is capable of protecting the core component by taking up additional water from the atmosphere. Attempts to obtain complete hydration are not only undesirable from a standpoint of optimum stability, but also usually cause caking in the fluid bed and agglomeration of discrete composite particles which have already formed.

The mean diameter of droplets of the buffered slurry must be from about 10 to 30 times larger than the mean particle size of the particles comprising the fluidized bed to provide preferential internal concentrations of the chlorocyanurate in product particles. The droplets size is readily controlled by proper choice of spray head, nozzle, or other means for introducing the droplets into the fluidized bed.

In the practice of this invention, the fluidization of the bed of sodium tripolyphosphate should be such that the fluidized salt occupies a volume of at least 1.2 times greater than an identical quantity of unfluidized salt. That is to say, a quantity of salt having a static volume of 100 cubic centimeters will, when properly fluidized in accordance with this invention, occupy a volume of at least 120 cubic centimeters. A fluidization volume of about 1.4 to 2.0 times the static volume is preferred. For many application, it is desirable to use a so-called "spouted" bed in which there is a distributed flow of gas sufficient to cause fluidization and one or more localized heavier flows of gas which cause the bed to "spout" upward and to circulate rapidly. The "spouts" may be in the form of single jets or in the form of a ring of jets near the wall of the containing vessel. Such "spouts" of rapidly rising gas and material have sufficient velocity to throw the bed material well above the upper bed level established by the distributed gas flow.

In pneumatically fluidized beds, particularly spouted beds wherein measurement of bed volume is difficult, the proper degree of fluidization can be more conveniently expressed as a fluidizing gas flow rate from 10 to 100% in excess of the minimum theoretically required to sustain a fluid bed, as measured by pressure drop through the bed.

It is possible to practice this invention by spraying the slurry into a flow of sodium tripolyphosphate particles entrained by the gas stream although this is not usually preferred because of the greater gas requirements and dust collection requiremenst of such a system.

The degree of fluidization can be readily controlled by varying the velocity of the fluidizing gas or the intensity of mechanical agitation.

In the process of this invention, the composition and size of the product particles and ratio of core component material to partially hydrated salt in the particles can be readily controlled by varying the concentration of chlorocyanurate contained in the slurry introduced, or varying the droplet size. For example, when introducing a slurry of a chlorinated isocyanurate salt containing 66% available chlorine into a sodium tripolyphosphate bed, one can readily control the available chlorine content of the composite product particle by varying the concentration of chlorinated isocyanurate in the feed slurry. Such feed slurry containing 60% solids by weight will yield a final product assaying 16% chlorine while a feed slurry containing 33% solids yields a final product at 6.5% available chlorine under comparable conditions.

The particle size of the composite product is closely related to the particle size of the droplets of feed slurry impinging on the fluid bed, thus, a choice of nozzle characteristics and slurry pressure permits control of the average particle size derived.

By controlling slurry droplet size and bed particle size as described above, a major portion of product particles desirably sized to pass a 10 mesh and be retained on a 100 mesh U.S. standard sieve are obtained.

It is seen that the process of this invention does not require a separate drying step. Furthermore, with a pneumatically fluidized bed, heat of hydration is rapidly dissipated by the fluidizing gas. This permits formation of products which are unique in terms of purity since thermal dehydration of inorganic salts such as sodium tripolyphosphate inherently results in degradation of a substantial proportion of such salt to the pyrophosphate and orthophosphate forms and may result in thermal degradation of the core component material.

The invention is further illustrated by the following examples.

EXAMPLE I

A buffered chlorocyanurate slurry is prepared by admixing about 8.1 pounds of water and about 0.95 pound of 110% phosphoric acid (cooling is provided via a heat exchange coil to maintain slurry temperature under 40° C., thereby avoiding thermal degradation of polyphosphates in this procedure). About 8 pounds of sodium tripolyphosphate hydrate to 18% water content and 9.7 pounds monotrichloro-tetra(monopotassium dichloro-isocyanurate) are added to the solution forming a buffered slurry.

About 14.8 pounds of the slurry is sprayed through a nozzle providing droplets of about 500 microns mean diameter onto a vigorously fluidized bed (about 1.4 times static volume) consisting of 40 pounds sodium tripolyphosphate having a means particle size of about 25 microns) and about 0.05 pound finely divided (<1 micron) silica flow conditioner. The slurry is added over a period of about 4 minutes. A quantity of granular (smaller than 12 mesh, larger than 70 mesh—U.S. standard sieve size) particles equivalent to about 88% of the weight of the fluidized bed and slurry introduced is recovered (i.e., 88% yield).

Microscopic examination of particles broken and dampened with potassium iodide solution to reveal the distribution of the chlorocyanurate, shows the chlorocyanurate to be disposed predominantly at the center of the particles. The particles contain about 72% by weight sodium tripolyphosphate, about 13.5% $H_2O$ (as water of hydration) and about 9.7% available chlorine.

Stability is determined by storing the particles (about 10 parts by weight) in admixture with 9 parts alkyl phenol ethoxylate nonionic surfactant, 81 parts granular sodium tripolyphosphate and 10 parts granular sodium metasilicate at 85% relative humidity at 100° F. for 4 days. Even under these severe storage conditions available chlorine loss is only 44% by weight.

Particle friability (the percentage of 100 grams of particles fragmenting into sizes small enough to pass an 8 inch diameter 100 mesh U.S. standard sieve size screen when mechanically agitated thereon for 15 minutes in the presence of three one inch diameter rubber balls) is 16%.

For purposes of comparison, the foregoing procedure is repeated using an unbuffered chlorocyanurate slurry. Granular product yield is 58%. Available chlorine loss on storage is 45% and friability is 35%.

EXAMPLE II

A buffered chlorocyanurate slurry is prepared according to the procedure set forth in Example I above, by admixing 500 grams water, 59 grams 110% phosphoric acid, 490 grams hydrated sodium tripolyphosphate containing 18% water, and 500 grams monotrichloro-tetra (monopotassium dichloro iso-cyanurate).

The slurry is sprayed into about 2725 grams anhydrous sodium tripolyphosphate (having a mean particle size of about 25 microns) which is continuously stirred in a ribbon blender.

Granular yield recovered from the blender is about 82% by weight of slurry plus sodium tripolyphosphate powder in blender.

The particles exhibit available chlorine loss of 63% by weight and friability of 15% by weight as determined by the tests described in Example I.

For purposes of comparison the procedure is repeated using an unbuffered slurry. The granular particle yield is 30% and the particles exhibit available chlorine loss of 73% and friability of 35% as determined by the described tests.

What is claimed is:

1. In a method of making a composition composed of particles comprising a chlorocyanurate and partially hydrated sodium tripolyphosphate, said chlorocyanurate being preferentially internally concentrated in said particle, said method comprising the steps of;
   (a) forming a fluidized bed of particulate, hydrateable sodium tripolyphosphate composed of a major proportion of particles from 5 microns to 200 microns in size,
   (b) introducing droplets of an aqueous slurry of said chlorocyanurate into said fluidized bed, said droplets having a mean diameter from 10 to 30 times larger than the mean particle size of said sodium tripolyphosphate, the amount of water introduced into the fluidized bed being less than stoichiometrically required for hydration of said sodium tripolyphosphate to the hexahydrate thereof, the improvement which comprises said slurry being buffered to a pH of from 5 to 8 by an amount of buffer at least equal to 25% by weight of the chlorocyanurate in said slurry.

2. The method of claim 1 wherein the amount of buffer is sufficient to provide particles containing at least 1% of said buffer by weight.

3. The method of claim 2 wherein the amount of buffer is sufficient to provide particles containing at least 2% of said buffer by weight.

4. The method of claim 2 wherein said fluidized bed is pneumatically fluidized by a gas flow rate from 10% to 100% in excess of the minimum flow rate theoretically required to support said bed in a fluidized state.

5. The method of claim 2 wherein said fluidized bed of sodium tripolyphosphate is composed of a major proportion of particles from 5 to 50 microns in size.

6. The method of claim 2 wherein said slurry is buffered by the presence therein of a buffer system resulting from the combination of an acidic component selected from the group consisting of phosphoric acid, acidic alkali metal salts of phosphoric acid, sulfuric acid, hydrochloric acid, superphosphoric acid, hydroxyethylidenediphosphonic acid, and mixtures thereof with less acid salts selected from the group consisting of alkali metal phosphates, phosphonates and polyphosphates in an aqueous medium to provide a pH from 5 to 8.

7. The process of claim 6 wherein said acidic component is phosphoric acid and said less acid salt is sodium tripolyphosphate.

8. A product prepared by the method of claim 1.

References Cited

UNITED STATES PATENTS

| | | | |
|---|---|---|---|
| 3,112,274 | 11/1963 | Mongenthaler et al. | 252—99 |
| 3,154,494 | 10/1964 | Speak et al. | 252—99 X |
| 3,248,330 | 4/1966 | Feirstein et al. | 252—99 |

MAYER WEINBLATT, Primary Examiner

U.S. Cl. X.R.

117—100 B, 118; 252—90, 316